DELAY LINE DISTRIBUTING ARRANGEMENT

Filed Oct. 14, 1948 2 SHEETS--SHEET 1

INVENTOR
HENRI MAURICE VEAUX
BY
[signature]
ATTORNEY

INVENTOR
HENRI MAURICE VEAUX
BY R P Morris
ATTORNEY

Patented Nov. 25, 1952

2,619,636

UNITED STATES PATENT OFFICE 2,619,636

DELAY LINE DISTRIBUTING ARRANGEMENT

Henri Maurice Veaux, Saint-leu-la-Foret, France

Application October 14, 1948, Serial No. 54,395
In France October 16, 1947

4 Claims. (Cl. 343—204)

The present invention relates to a signal distributing system.

In accordance with the present invention use is made of a delay line or a filter, having multiple tappings between successive cells, as a means for storing signals, these multiple tappings being sufficiently numerous so that the voltages picked up over them correspond at a given instant of time to an acceptable reproduction of the signals stored at the same instant of time. A switch is provided for successively scanning the various taps to vary the duration of the signals traversing the line.

The above-described system is capable of numerous applications particularly in the case of segregation of signals of the same frequency propagated in opposite directions over a circuit, in multiplex transmission, and transmission with reduced frequency band, in measuring apparatus and in apparatus for producing artificial reverberation or echo effects.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
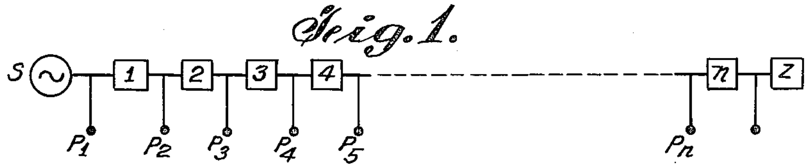
Fig. 1 is a schematic and block diagram of a delay line associated with one signal source.

Let us consider (Fig. 1) a delay line or a filter the $n$ cells of which 1, 2, 3 . . . $n$ are terminated in an iterative or impedance matching resistance Z. A source S is connected at the input. If at the entrance of each cell a tap is established there is obtained at time $t$ on the taps P1, P2 . . . P$n$ potentials each representing an ordinate of the curve corresponding to the slice of signals contained at the same instant of time $t$ between the origin and the extremity of the delay line. If these ordinates are sufficiently close they will suitably characterise the shape of the slice of signals stored in the delay line. Thus, for instance, a line producing a delay $\theta=10$ milliseconds with a number of cells $n=80$, gives an acceptable representation of commercial telephone signals.

Figure 2:
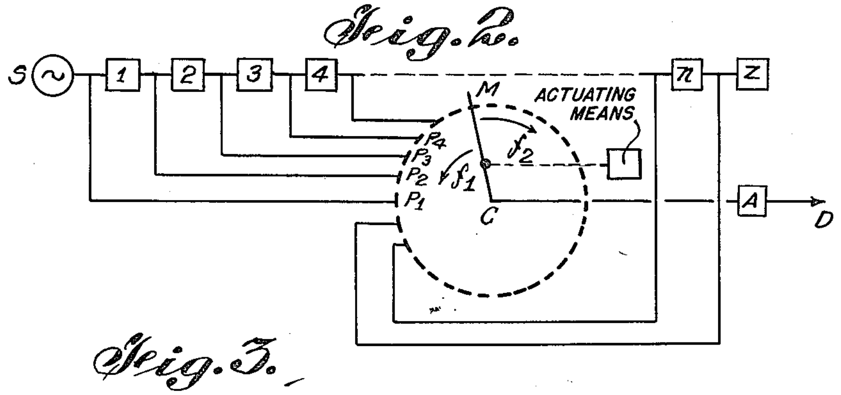
Fig. 2 is a schematic and block diagram of a delay line associated with one signal source having its tappings coupled to a switch.

One of the main applications of the present invention consists in setting up with a delay line a system for altering the duration of signals emanating from a source S. For this purpose there is associated with the line (Fig. 2) a switch C, the mobile arm M of which successively scans with a uniform movement the contacts $P_1$, $P_2$ . . . $P_n$. At each passage over a contact there is picked up at the output D an impulse characteristic of the instantaneous value of the signal on the corresponding tap. In the case of a displacement of M in the direction of arrow $f_1$, so that the exploration of the contacts is made in the direction leading towards the source, the successive impulses, in sufficient numbers, give a component current which reproduces with a reduction of duration, the signals which are propagated over the line. For a displacement in the direction of $f_2$ leading away from the source towards the output Z an increase in the speed of M gives first an increase in the duration of scanning followed by a scanning corresponding to an inversion of time. For a critical speed such that the passages over the successive contacts are made at time intervals corresponding to the duration of propagation over one cell the current at output D reproduces the damping curve of a signal along the line; it is continuous in the theoretical case of a line without loss or in the case of a line with compensated damping, that is to say such that the amplification of the amplifier A varies according to the position of M and increases when M passes from $P_1$ to $P_n$.

The example of a sinusoidal wave from source S of period T (frequency N) acting at the origin of a line giving a delay $\theta$ will clarify the operation of the system: switch M being at rest on a contact, the signal at output D is a sinusoidal signal of frequency N; when M rotates in the direction of arrow $f_1$ at the rate of $N_1$ revolutions per second, the frequency F of the output signal is greater than M and in accordance with a simple calculation of the Doppler Fizeau effect, it has for value:

$$F=N(1+N_1\theta) \quad (1)$$

For a continuous rotation of the switch there are scanned successive trains of identical portions of signals which are propagated over the line. For a scanning in the direction of arrow $f_2$ a similar calculation leads to the formula:

$$F=N(1-N_1\theta) \quad (2)$$

When, N and $\theta$ being fixed, $N_1$ increases, the frequency of the current at the output decreases down to zero and increases again; the zero value of F takes place when:

$$N_1\theta=1 \text{ that is } T_1=\theta \quad (3)$$

This is the obvious result since under these conditions the movement of the switch accompanies the displacement of the signal over the line. Beyond the value of $N_1$, which gives a frequency F equal to 0, the output frequency increases and reaches again the value N when:

$$N(N_1\theta-1)=N$$

that is $$\theta=2T_1 \quad (4)$$

Figure 3:
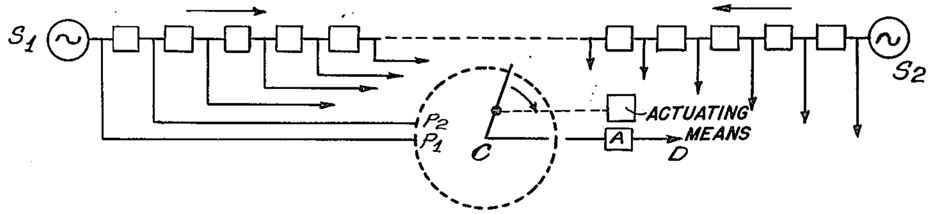
Fig. 3 is a schematic and block diagram of a system similar to Fig. 1 except that two sources are employed.

If use is made of the line giving a delay in both directions from sinusoidal sources $S_1$ and $S_2$ of same frequency F (Fig. 3) there are obtained at the output D two currents the different frequencies of which are:

$$F'=N(1+N_1\theta)$$
$$F''=N(1-N_1\theta)$$

Figure 4:
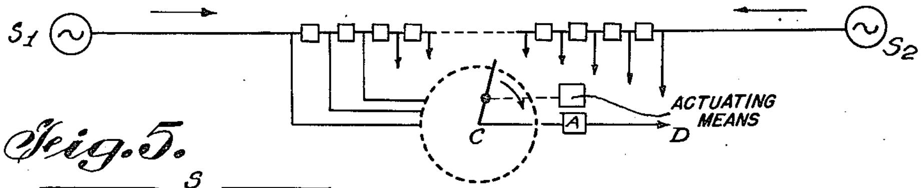
Fig. 4 is similar to Fig. 2, showing an arrangement of the nature of Fig. 2 between two transmission lines.

The system provides a dissymmetric law of transmission, it is therefore possible to segregate signals having the same frequency. The process which is part of the invention permits the same frequency to be used simultaneously for communications made in both directions on the same circuit. There is interposed (Fig. 4) at a selected point of the circuit the delay L associated with a switch C; this switch gives at the output D signals of different frequencies according to whether they originate from one or the other of the sources $S_1$ or $S_2$; an adjustment of the speed of switch C permits the desired frequency in D to be obtained; the system may be adapted inter alia for a broadcast transmission where two different programs are transmitted on the same carrier wave by the sources $S_1$ and $S_2$ and may thus be separated at any point along the circuit.

Figure 5:
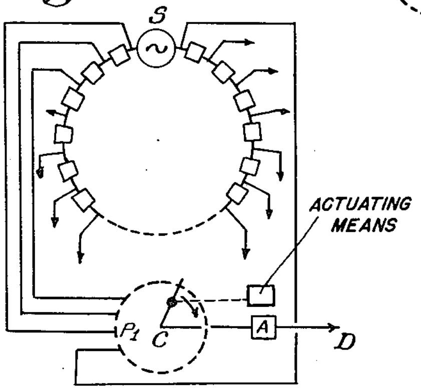
Fig. 5 is a schematic and block diagram of the system similar to Fig. 2 in which the same source is coupled to both ends of a delay line.
Figure 6:
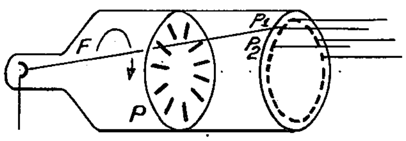
Fig. 6 is a schematic diagram of a cathode ray tube switch.

By closing the delay line over on itself (Fig. 5) through a source S, there is obtained at the output D two components of frequencies F' and F''.

In practice, the delay line may comprise cells of classical type with condensers and coils or may be made of electromechanical elements or preferably by means of electronic elements. It is advantageous inter alia to use for this purpose a known cathode ray distributing or cyclophone tube the description of which is briefly as follows: an electronic beam F, moving in a rotating movement either in the direction $F_1$ or $F_2$ mentioned above, will traverse a plate P provided with slots facing the electrodes $P_1, P_2 \ldots P_n$ respectively connected to taps uniformly distributed over the delay line. The potential of plate P is higher than that of the electrodes, the secondary emission of each plate obtained during the passage of the beam providing an impulse the intensity of which depends upon the instantaneous potential of the electrode considered.

Figure 7:
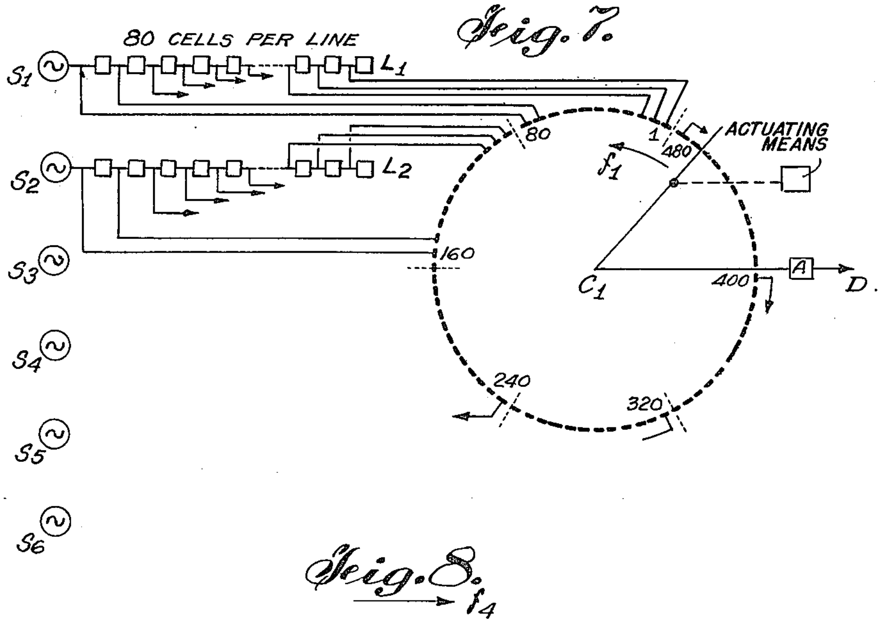
Figs. 7 and 8 are schematic and block diagrams of a multichannel transmission and receiving system respectively.
Figure 8:
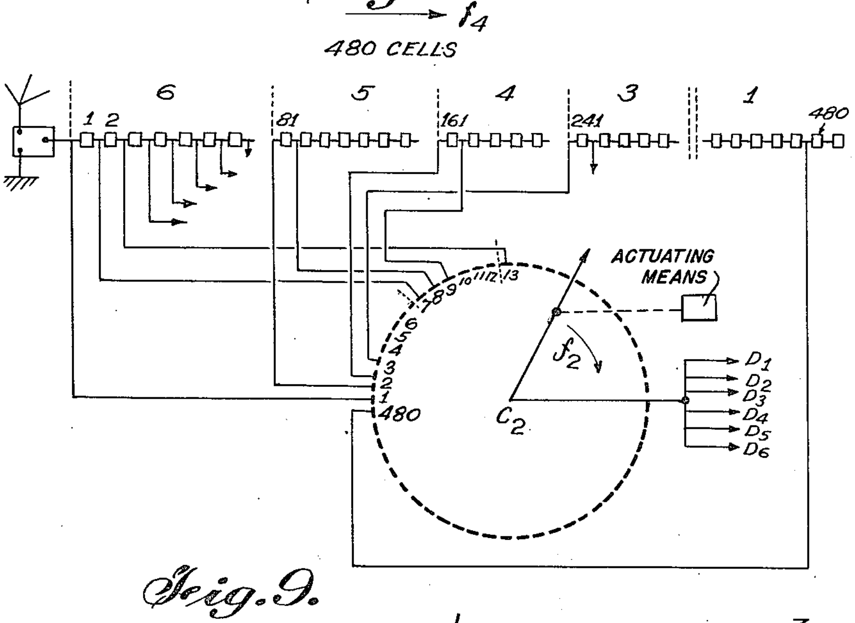

The set constituted by the delay line and the switch may replace in all its applications any system provided for altering the duration of signals; it may be adapted in particular to the provision of various systems, such as a multiple transmission system set up according to the indications of Figs. 7 and 8 corresponding to six telephone transmissions for instance, in these figures only the elements corresponding to the first two transmissions are shown.

At the transmitting station (Fig. 7) six sources $S_1$, $S_2$, $S_3$ feed six delay lines $L_1$, $L_2$ etc. The 80 taps of each delay line feed the contacts of a switch or of several associated switches. A transmission cycle corresponds to the scanning of 80×6=480 contacts of the six lines. Since the delay given by each line is equal, for instance, to 10 milliseconds, the switch scans the six lines successively at a rate of $$\frac{10}{6}$$

milliseconds per scanned line. A transmission cycle corresponds at the output of the switch to a series of six equal trains, each one corresponding to one transmission the signal of which has been subjected to an adequate reduction of duration. A leading edge synchronising signal for each cycle is used for separating the channels at the receiver;

At the receiving station (Fig. 8) the receiver feeds a single delay line L which transmits signals, the frequency of which is six times higher than that of the initial telephone signals, the delay of the line for all frequencies below 6×3,000=18,000 c/s. (cut-off frequency) is equal to 10 milliseconds. The number of cells is six times greater than that of each delay line $L_1$, $L_2$ etc. . . used at the transmitter; it is therefore equal to 6×80=480. The line L consequently contains all the signals of the six channels corresponding to a transmission cycle. At a given instant of time these signals occupy on the line the position shown in Fig. 8. They are propagated in the direction of arrow $f_4$. It is necessary that, in this propagation in the ten following milliseconds along L, the switch $C_2$ spread in the same interval of time of 10 milliseconds the impulses of each signal train of a channel supplied in $$\frac{10}{6}$$

milliseconds by receiver R. Switch $C_2$ comprises 480 contacts distributed in 80 groups of six contacts. The 480 taps provided on the line are divided into six successive groups and connected to the 480 contacts in such a way that six successive contacts belong to a different group. The scanning of the 480 contacts is made in 10 milliseconds propagation time of the signal along the line. The impulses obtained on each contact are directed towards the six output channels $D_1$ to $D_6$. As will be seen there exists a single local synchronism, easy to provide, between the movement of switch $C_2$ and the signal trains appertaining to the six channels. It will be noted that the attenuations due to the losses over the lines are in opposite directions at the transmitter and at the receiver. A compensation may thus be obtained.

The fact that the signals are stored in the delay line lends itself to other applications, and in particular to the setting up of measuring apparatus to be used in relation with (1), (2), (3) and (4). For a sinusoidal source S and a constant rotation of the switch C (Fig. 1) the frequency of the average current in D is equal to $\theta$ when equation (3) is fulfilled. One may, starting from this assumption, control the rotation of the switch in accordance with the duration of the propagation over the line.

Figure 9:
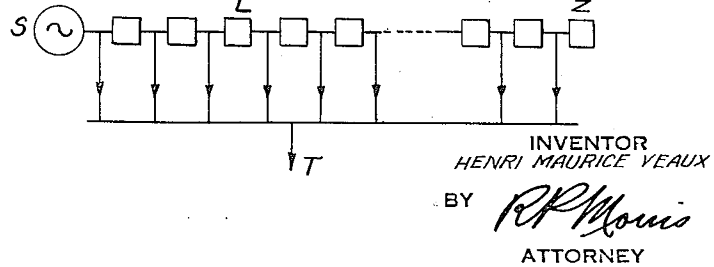
Fig. 9 is a schematic and block diagram of an arrangement for producing echo or reverberation effects.

The use of a delay line with intermediary multiple tappings permits artificial reverberation effects in broadcasting to be obtained. The signals emanating from a microphone (Fig. 9) are collected over the multiple intermediary tappings made on a delay line Z between elements of successive cells. The superposition of these final signals involves the reverberation effect.

While I have shown specific embodiments of my invention it is to be understood that this is only for the purpose of illustration and that the scope of the invention is to be limited solely by the appended claims.

What is claimed is:

1. A distributing system for continuous wave signals comprising a source of continuous wave signals of a given frequency, a delay device connected at one end to said source and having a plurality of tapping points of equal delay, a switch having a plurality of successive contacts, and contact means for connecting to said contacts, means for connecting successive tapping points of said delay device to successive contacts, and actuating means for causing said contact means to sweep said contacts cyclically at a repetition frequency greater than said given frequency, said switch being a cathode ray tube type distributor, said contact means being the beam and said contacts being the target elements.

2. A distributing system for continuous wave signals comprising a source of continuous wave signals of a given frequency, a delay device connected at one end to said source and having a plurality of tapping points of equal delay, a switch having a plurality of successive contacts, and contact means for connecting to said contacts, means for connecting successive tapping points of said delay device to successive contacts, an actuating means for causing said contact means to sweep said contacts cyclically at a repetition frequency greater than said given frequency, another signal source and means for connecting said other signal source to the end of the delay device opposite to the end connected to the first mentioned signal source.

3. A distributing system according to claim 2 in which said other signal source provides signals of the same frequency as said given frequency.

4. A distributing system for sampling and compressing in time the samples of a plurality of continuous wave signals from different sources comprising a plurality of sources of continuous wave signals, a plurality of delay devices each connected at one end to one of said sources and each having a plurality of tapping points of equal delays, a switch having a plurality of successive contacts and contact means for connecting to said contacts, means for connecting successive tapping points of successive ones of said delay devices to successive contacts of said switch, and actuating means for causing said contact means to sweep said contacts successively and cyclically at a repetition frequency greater than the frequency of any of said signals from said sources.

HENRI MAURICE VEAUX.

REFERENCES CITED

The following references are of record in the file of this patent:

UNITED STATES PATENTS

| Number | Name | Date |
|---|---|---|
| 1,671,143 | Campbell | May 29, 1928 |
| 2,172,354 | Blumlein | Sept. 12, 1939 |
| 2,186,742 | White | Jan. 9, 1940 |
| 2,275,224 | Henroteau | Mar. 3, 1942 |
| 2,318,417 | Phelps | May 1, 1943 |
| 2,367,277 | Henroteau | Jan. 16, 1945 |
| 2,414,265 | Lawson | Jan. 14, 1947 |